(No Model.)
C. G. CASE.
THRASHING MACHINE.
No. 350,290. Patented Oct. 5, 1886.
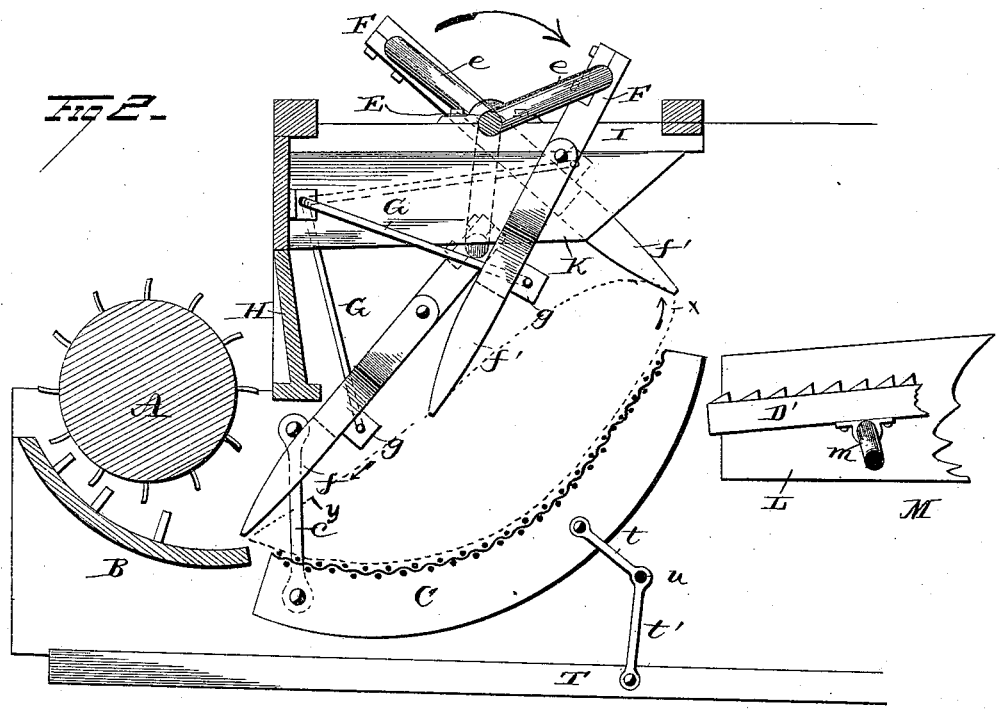
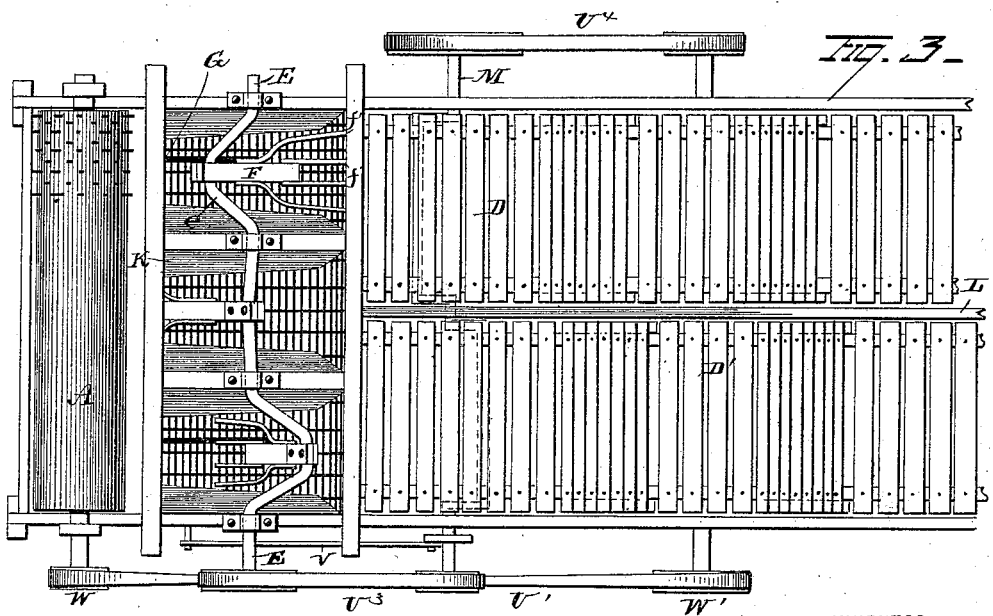
WITNESSES
INVENTOR
Constantine G. Case
By H. A. Seymour Attorney

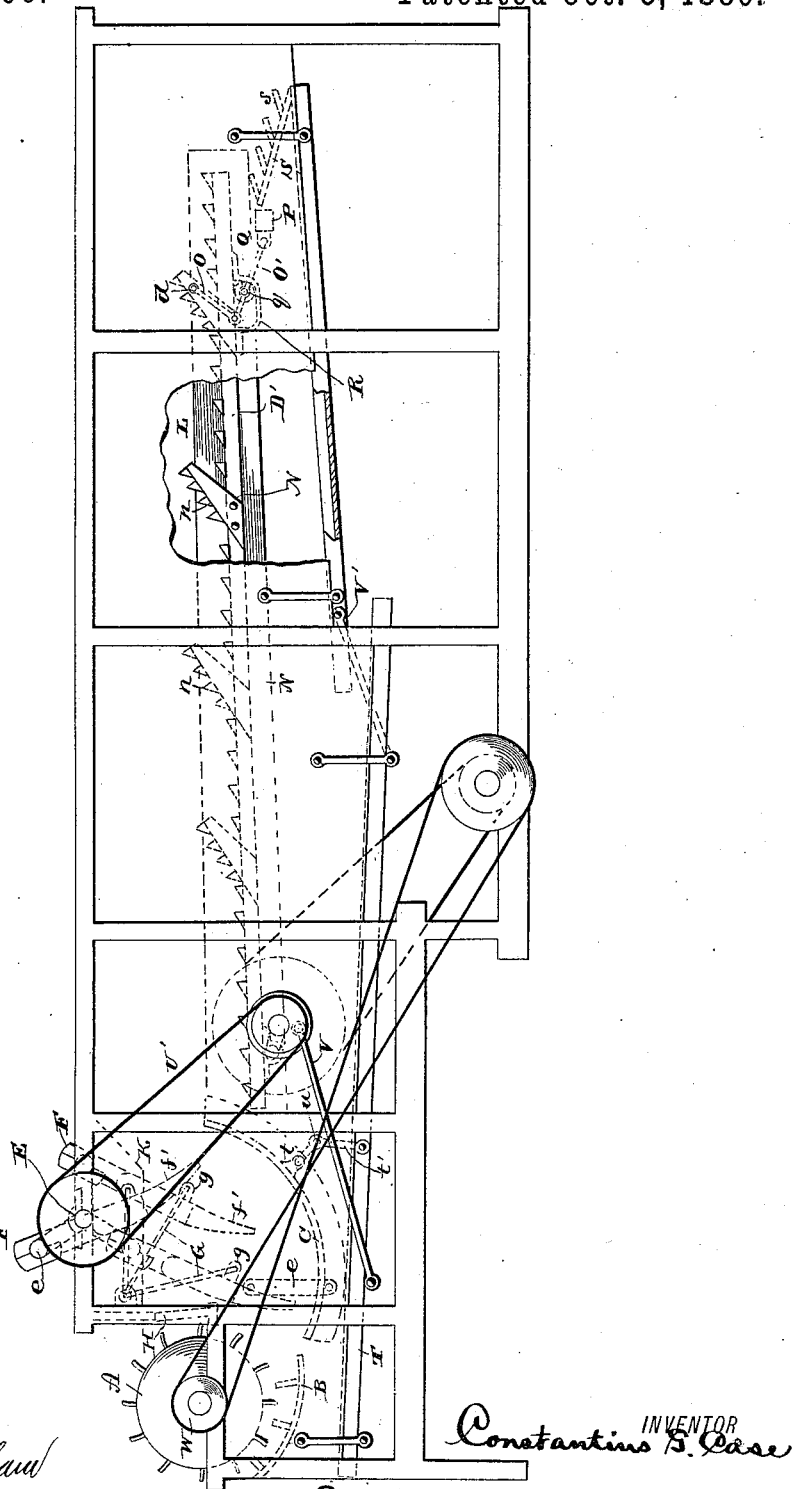

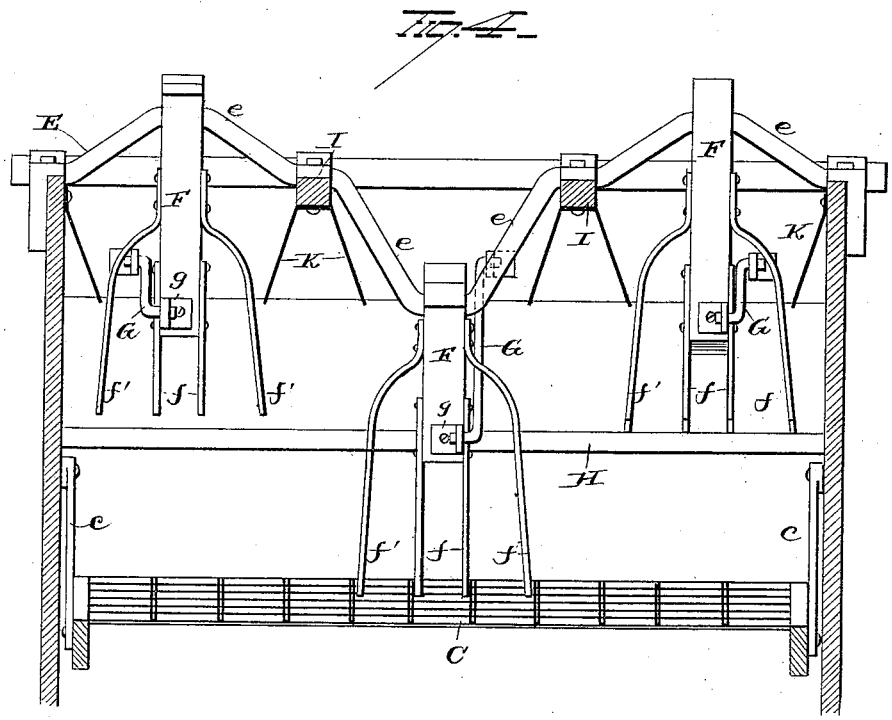

UNITED STATES PATENT OFFICE.

CONSTANTIUS G. CASE, OF BATTLE CREEK, MICHIGAN.

THRASHING-MACHINE.

SPECIFICATION forming part of Letters Patent No. 350,290, dated October 5, 1886.

Application filed February 12, 1886. Serial No. 191,706. (No model.)

*To all whom it may concern:*

Be it known that I, CONSTANTIUS G. CASE, of Battle Creek, in the county of Calhoun and State of Michigan, have invented certain new and useful Improvements in Thrashing-Machines; and I do hereby declare the following to be a full, clear, and exact description of the invention, such as will enable others skilled in the art to which it appertains to make and use the same.

My invention relates to an improvement in thrashing-machines.

Hitherto in that class of thrashers in which the thrashed straw and chaff is forced rearwardly to the carriers and shakers by a series of forks the forks have been liable to tangle in the straw to a greater or lesser degree, and the straw, especially when slightly damp, has been liable to mat down on and move sluggishly over the grate beneath the forks, thereby lessening the efficiency of the grate by preventing the passage of the grain through its meshes.

The object of my present invention is to provide an improved construction and mounting of the forks, whereby they will be caused to reach back well under the thrashing-cylinder with a plunge motion, follow the curve of the grate up to the end of the shaker-carriers, and then leave the straw by a retrograde movement in the direction opposite that in which the tines point; and, further, to provide a deflector at the rear of the thrashing-cylinder to prevent the straw from flying up and to guide it into a position to be handled by the said forks.

A further object is to provide a shaking-grate beneath the forks for keeping the straw agitated and loosened up as it travels over the grate.

A further object is to provide a pair of shaking or longitudinally-vibrating carriers or tables adapted to receive the straw from the grate and forks, the rear end of the said shaking-carriers being so supported that their rise shall be less than their horizontal throw.

With these ends in view my invention consists in certain features of construction and combinations of parts, which will be hereinafter described, and pointed out in the claims.

In the accompanying drawings, Figure 1 is a side elevation of the portion of the machine embodying my invention. Fig. 2 is a view in side elevation with the side of the casing removed to show the interior. Fig. 3 is a plan view; and Fig. 4 is a vertical transverse section of the machine, showing more particularly the forks.

A represents the thrashing-cylinder, mounted near the front of a suitable supporting-frame; and B represents the concave located beneath the cylinder A, and adapted to hold the grain in engagement with the cylinder. At the point where the concave terminates in the rear of the cylinder the grate C begins, and with, at first, a slightly downward direction curves rearwardly and upwardly to the shaker-carriers D D'. The grate C is suspended in a forwardly and backwardly vibrating adjustment, preferably by means of two hangers, $c$, secured by loose joints to the thrasher-frame and end bars of the grate, respectively. The means for vibrating the grate will hereinafter appear.

Above the grate C a crank-shaft, E, is journaled in the thrasher-frame for supporting and operating the forks F. The shaft E is provided with as many cranks as there are forks, the number of which may be one or more; but I find it preferable to use three. The fork-heads are elongated, as shown, in the direction of what would ordinarily form the tang, two middle teeth, $f$, being secured to the end of the head, and two outside teeth, $f'$, being secured a short distance above the ends of the head, and branching outwardly and downwardly to correspond with the two middle teeth. The upper ends of the fork-heads are loosely mounted on the cranks $e$ of the shaft E, and the lower ends of the heads are connected with the front of the machine-frame or with supports located in front of the forks by links or connecting-arms G, loosely secured to the fork-heads and the supports. The arm G preferably extends along the side of the fork-head and is pivotally secured in a bracket-arm, $g$, attached to the rear side of the fork-head.

The relative lengths of the arms G and cranks $e$ are such that while the crank $e$ is moving through the first two-thirds or more of its quarter-revolutions either from a horizontal position to an upright position, or from a horizontal to a depending position, the effect of the wrist-pin of the crank (traveling in a curved path) upon the fork-tines, is counteracted by the arm G in such a manner that the tines travel in a straight line, their points describing a figure similar to that shown in dotted lines in Fig. 3, the arrows representing the direction of travel, and the letters $x$ and $y$ denoting the path of the points during the part revolutions of the cranks above referred to. It will be noticed from the above that the points of the tines plunge into the straw at the rear of the thrashing-cylinder in nearly or quite a straight line, reaching well under the cylinder before beginning their rearward travel, and that at the end of their rearward travel they recede from the straw in nearly or quite a straight line before beginning their forward travel. Immediately after beginning their rearward travel the points of the tines travel in a downwardly and rearwardly extending path for a short distance and then in an upwardly-curved path, following the curves of the grate C.

The cranks $e$ radiate from the shaft E at angles of about one hundred and twenty degrees with each other, thereby balancing the forks on the shaft E as nearly as possible and keeping some one of the forks constantly employed in forcing the straw rearwardly.

Between the outer and middle cranks $e$ the shaft E is journaled in suitable bearings in girders I, connecting two cross-bars of the thrasher-frame. To the under side of the said girders are secured guide-plates K, conveniently formed of sheet metal and bent reverse-U shape in cross-section, forming channels or conduits from front to rear over the grate C. The lower edges of the plates are adapted to lie in close proximity to the paths of the outer fork-tines, and half-plates are secured to the sides of the machine to cover the spaces between the sides and the paths of the outer tines of the outer forks. The conduits formed by the plates K and $k$ direct the course of the blast toward the rear of the machine when the straw is in motion over the grate, and the dust, chaff, and straw are stripped from the forks and drawn into the said conduit and carried to the rear.

At the rear of the thrashing-cylinder A, over the point where the forks plunge into the straw, is located the guard-board H, the object of the same being to prevent the straw from flying up over the cylinder and out. The lower face of the board H extends from a close proximity to the ends of the teeth on the thrashing-cylinder, a short distance to the rear, and serves not only to prevent the straw from flying up, but also to guide it rearwardly in a direction favorable for the grasp of the fork-tines. After leaving the grate C the straw is received on a pair of shaking-carriers, D D'. The carriers D D' are located side by side in the same horizontal plane, and separated by a smooth partition wall, L. The front ends of the carriers are mounted on the oppositely-extending cranks $m$ of a transverse shaft, M, journaled in the thrasher-frame. The upper face of each carrier is provided with a series of steps, N, on each edge having a rake toward the rear as shown, and cross-slats $n$ are secured on the upper inclined faces of the steps at a short distance apart.

The rear ends of the shaker-carriers D D' are suspended as follows: A jointed arm, consisting of two sections, O O', is loosely connected at one end to the carrier D at a point, $d$, above its general level, preferably to one of the rearmost steps, N, and at the opposite end to a stationary cross-bar or other support, P. The arm-section O, which is hinged at one end to the support P, is provided, at a point somewhat more than one-half the distance from its connection with P to its connection with the arm-section O', with a laterally-extending stud, $q$, on which is mounted a roller, Q; or a pin or the stud itself might slide in the slot; but the roller is preferred, on account of the reduction of friction. The roller Q works longitudinally in an elongated slot, R, formed in a bracket secured to the under side of the carrier D, or in the carrier itself. The bearing of the carrier D on the roller Q, in conjunction with the attachment of the said carrier to the arm-section O', and the limit of the horizontal throw of the carrier serve to support the rear end in such a manner that the actual rise of the rear end will only be about two-thirds as much as the horizontal throw, whereby the straw is carried more rapidly and smoothly to the rear and kept loosened up and shaken to remove the seed. As the arm-sections O O' open and close, the roller Q plays forwardly and backwardly in its slot R. At the rear of and below the shaker-carriers D D' is located a return-shaker, S. The rear end of the shaker S is provided with slotted steps $s$, on which the straw, chaff, &c., first falls as it leaves the shaker-carriers D D'. The finer cut straw and chaff falls through the slotted face of the step $s$, while the coarser straw slides on and is taken by the straw-carrier to the stack. The fine straw and chaff is returned on the shaker S toward the front and falls on the main shaker T, from whence it is delivered to the fanning-mill. By means of the return-shaker S, the grain which is lodged in the fine straw and chaff, and which has hitherto been carried away with the straw and lost, is saved.

The several parts above described are operated as follows: The main drive-belt U leads from the engine or other power to a pulley on the thrasher-cylinder shaft W. Motion is communicated from thence to the blower-shaft W' by a cross-belt, U'. A belt, U'', on the opposite side of the machine, communicates the motion of the shaft W' to the double crank-shaft M, which vibrates the shaker-carriers, and a belt, $U^3$, communicates the motion of the crank-shaft M to the cranked fork-shaft E. It will thus be seen that the shaft carrying the forks rotates in the opposite direction from the shaft carrying the thrashing-cylinder. The relative speeds of the different shafts are determined by the relative sizes of the driving and driven pulleys. A pitman, V, attached to an eccentric pulley or crank on the double crank-shaft M, serves to vibrate the main shaker T. A pitman, V', attached to a main shaker, T, and the return-shaker S serves to communicate the vibrations of the main shaker to the return-shaker, and the vibrations of the main shaker T also communicates a vibratory motion to the curved grate C, by means of arms $t$ and $t'$, both secured rigidly on a rock-shaft, $u$, journaled in the thrasher-frame, the former, $t$, being loosely secured to the main shaker T and the latter to the curved grate C.

It is evident that the curved grate might be suspended in other ways than that shown, and that the shaker-carriers might be suspended at their rear ends by a link or slide instead of the jointed arm, and that the number of fork-teeth might be increased or diminished, and that the return-shaker, curved grate, and main shaker might be one or all of them operated by pitmen or other devices leading from shafts other than those shown, and particularly the return-shaker might be actuated independently of the main shaker by a pitman leading to the double crank-shaft M. The shaking-carriers might also be located immediately in the rear of the thrashing-cylinder, and other changes might be resorted to in the form and arrangements of the several parts described without departing from the spirit and scope of my invention, hence I do not wish to limit myself strictly to the construction herein set forth; but, Having fully described my invention, what I claim as new, and desire to secure by Letters Patent, is—

1. In a thrasher, the combination, with thrashing devices, a grate to receive the straw, a crank-shaft, and guiding-arm, of a fork mounted on the shaft and connected to the arm and adapted to force the straw away from the thrashing devices, the above parts being relatively adapted and arranged, substantially as described, to give the fork an extended plunge movement substantially in a straight line to engage the straw, a curvilinear movement while forcing the straw to the rear, a movement directly away from the straw to release it, and a slightly curved movement from thence to the beginning of said plunge movement, substantially as set forth.

2. In a thrasher, the combination, with a frame-work, a thrasher-cylinder, a crank-shaft, and forks mounted on said crank-shaft, of an arm arranged to guide the free end of the fork under the cylinder in an extended straight plunge to engage the straw, substantially as set forth.

3. In a thrasher, the combination, with a thrashing-cylinder and a curved straw-guide leading rearwardly therefrom, of one or more straw-carrying forks suspended from a crank-shaft over the curved guide, and links or connecting-arms attached to the thrasher-frame, and to the fork-heads below their connections with the shaft, substantially as set forth.

4. In a thrasher, the combination, with a thrashing-cylinder, and straw-carrying forks located in the rear of the cylinder, of a concave grate located below the straw-carrying forks, and devices for vibrating said grate, substantially as set forth.

5. In a thrasher, the combination, with a thrashing-cylinder and a straw-carrying fork located in the rear of the cylinder, of a concave grate located at the rear of the cylinder below the fork, hangers for supporting the grate, and devices, substantially as described, for vibrating the grate, substantially as set forth.

6. In a thrasher, the combination, with a thrashing-cylinder, a grate located behind the cylinder, and a guard-board located behind the cylinder and over or approximately over the front end of the grate, of a crank-shaft, a fork located behind the guard-board, and an arm arranged to guide the free end of the fork under the cylinder in an extended straight plunge, substantially as set forth.

7. In a thrasher, the combination, with a frame and a cylinder mounted thereon, of a shaker-carrier mounted at one end on a crank-shaft, and a jointed arm, the sections of which are connected to and support the other end of the shaking-carrier, substantially as set forth.

8. In a thrasher, the combination, with a vibrating carrier and a crank-shaft supporting one end of said carrier, of a jointed arm adapted to support the other end of the vibrating carrier, one of the arm-sections being secured at one of its ends to a rigid support and between its ends to the vibrating carrier, and the other arm-section being secured to the carrier at its end, substantially as set forth.

9. In a thrasher, the combination of a supporting-frame, a shaker-carrier, a crank-shaft supporting it at one end and a jointed arm supporting the other end of said shaker-carrier, one of said arm-sections being secured at one of its ends to a rigid support and between its ends to the vibrating carrier, and the other arm-section being secured to the carrier at its end, the parts being arranged substantially as described, whereby the rise of the end of the carrier so attached will be less than its horizontal throw, substantially as set forth.

In testimony whereof I have signed this specification in the presence of two subscribing witnesses.

CONSTANTIUS G. CASE.

Witnesses:
E. C. SEWARD,
G. F. DOWNING.